No. 794,184.

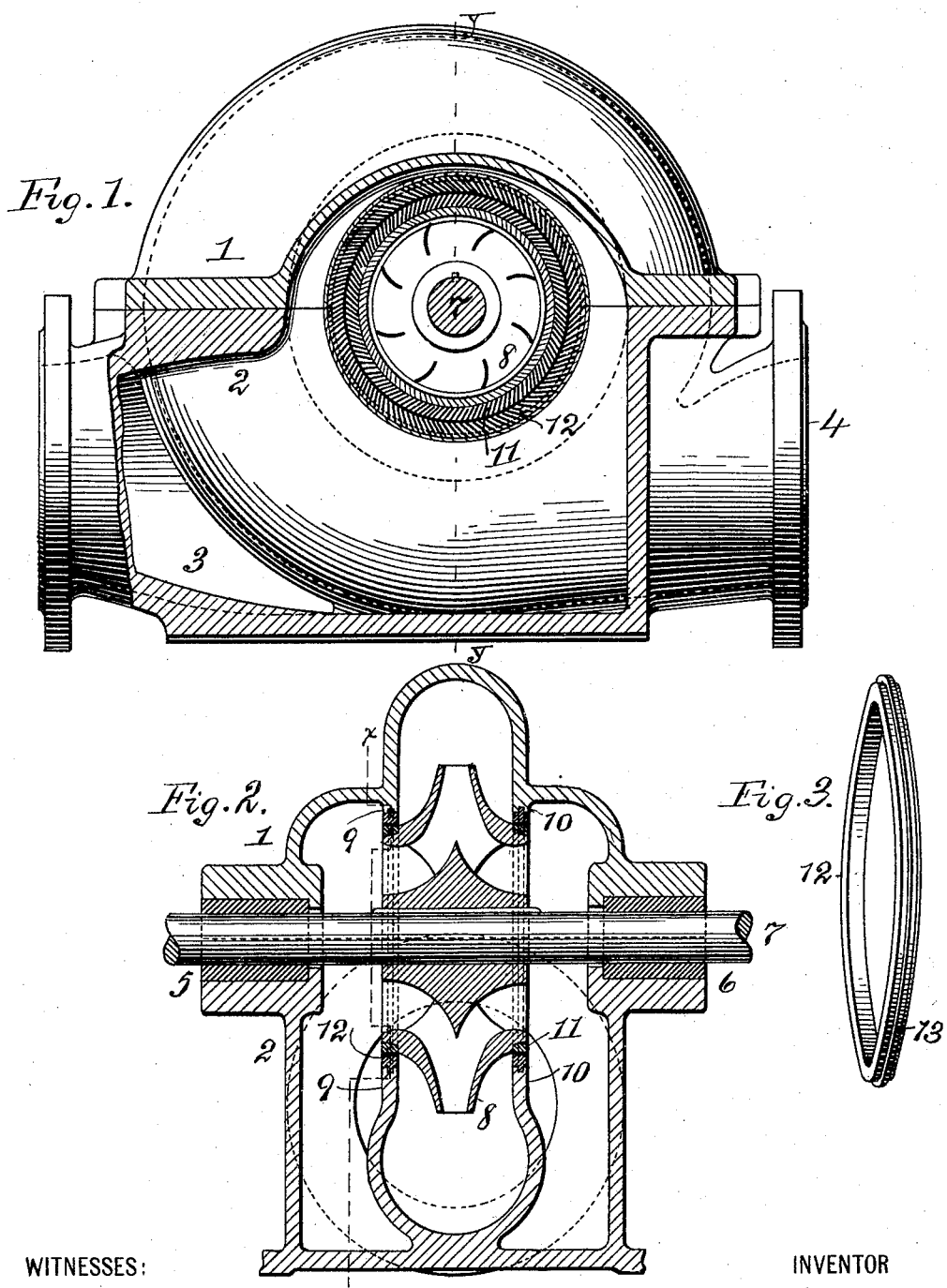

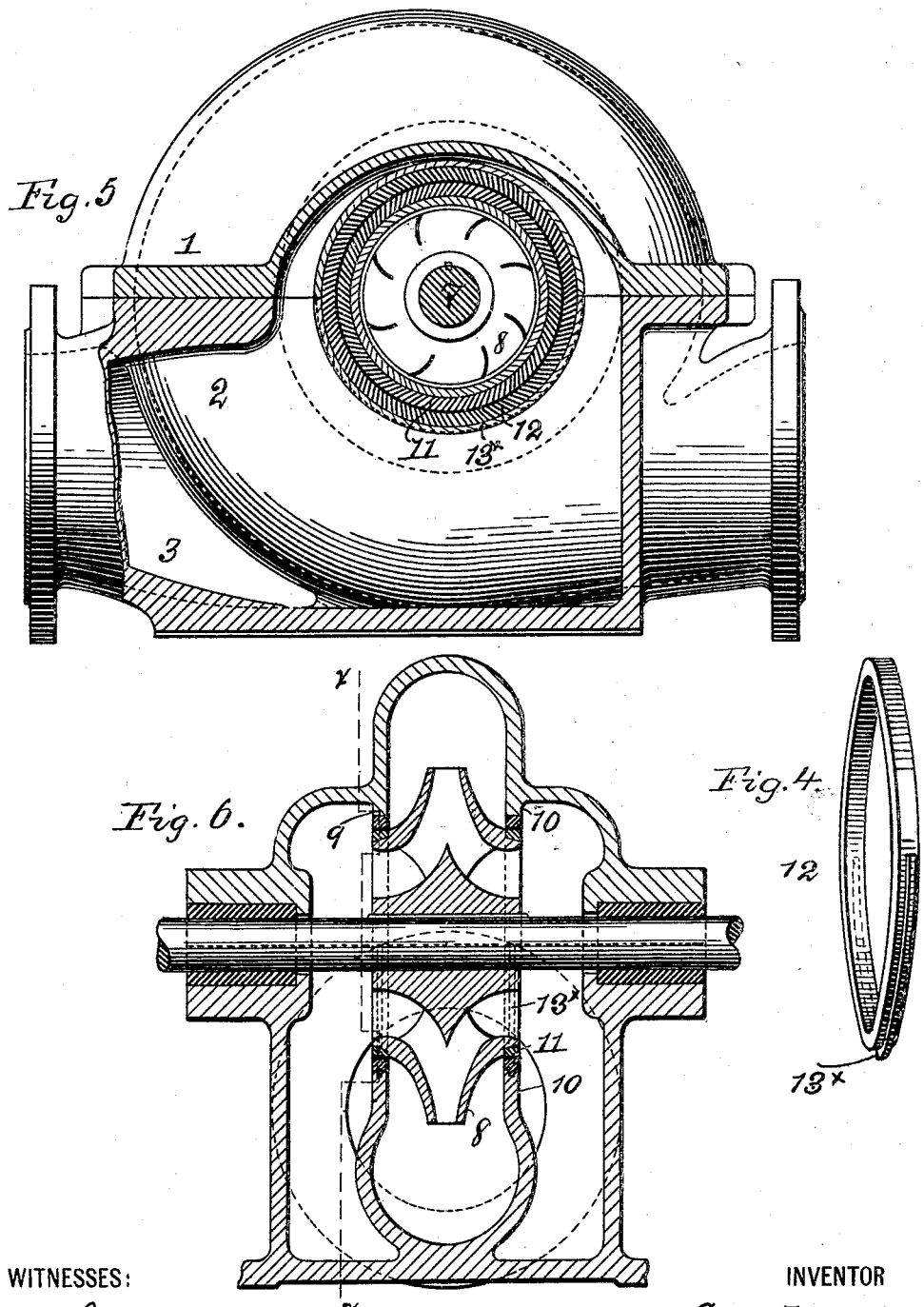

Patented July 11, 1905.

UNITED STATES PATENT OFFICE.

ELOF MEDEN, OF NEW YORK, N. Y., ASSIGNOR TO DE LAVAL STEAM TURBINE COMPANY, A CORPORATION OF NEW JERSEY.

WEARING-RING FOR CENTRIFUGAL PUMPS.

SPECIFICATION forming part of Letters Patent No. 794,184, dated July 11, 1905.

Application filed July 21, 1904. Serial No. 217,583.

*To all whom it may concern:*

Be it known that I, ELOF MEDEN, of the city, county, and State of New York, have invented a new and useful Improvement in Wearing-Rings for Centrifugal Pumps, of which the following is a specification.

The invention relates to centrifugal pumps; and it consists in the combination with the pump-wheel or the pump-casing inclosing said wheel, or with both, of a ring or rings constructed to receive the frictional wear at the joint between wheel periphery and casing.

The invention consists also in the construction of the ring secured within the casing, as hereinafter more particularly set forth.

In the accompanying drawings, Figure 1 is a section of a centrifugal pump, showing wearing-rings applied to both pump wheel and casing on the line $x\,x$ of Fig. 2. Fig. 2 is a section on the line $y\,y$ of Fig. 1. Fig. 3 shows separately the wearing-ring which is applied to the casing. Fig. 4 shows a modified form of said ring. Fig. 5 is a section similar to Fig. 1, and Fig. 6 a section similar to Fig. 2 with said modified form of ring in place.

Similar numbers of reference indicate like parts.

The pump-casing is divided horizontally into two sections 1 and 2, which are detachably secured together by any suitable means. The inlet 3 and outlet 4 are formed in the lower section 2. The bearings 5 and 6 for the wheel-shaft 7 are in both sections. The pump-wheel 8 of usual construction is keyed on shaft 7. Ordinarily within the casing-sections there are formed semicircular flanges 9 and 10, which inclose the pump-wheel and make a joint with the periphery thereof. Between the meeting faces of said flanges and of the wheel periphery there is apt to be much wear, especially if the liquid pumped contains grit or dirt. This soon results in undesirable leakage and frequently renders renewal of the casing necessary. To obviate this difficulty, I form on the periphery of the pump-wheel 8, at the ends thereof, inclined or outwardly-tapering shoulders upon which I place wearing-rings 11, of any suitable metal, such as bronze. The rings 11 may be driven tightly upon the tapering shoulders, and so secured in place.

Surrounding the rings 11 are rings 12, having an external rib 13 formed around their circumference, which rib enters a corresponding groove in the casing-flanges 9 and 10. The inner circumferential faces of the rings 12 bear upon the outer circumferential faces of the rings 11, and hence the frictional wear, due to the rotation of the pump-wheel 8, comes on said rings.

In assembling the parts the rings 12 are placed upon the rings 11 and the upper casing-section 1 being removed the rib 13 is seated in the groove in the flanges 9 and 10 of the lower section. The upper section is then placed in position, the groove in its flanges 9 and 10 receiving the rib 13. It will be obvious that the wearing-rings are easily removable whenever worn, so that new ones can be substituted. In this way the effective lifetime of the pump is greatly increased. The object of the rib 13 on the rings 12 is to prevent lateral displacement of said rings.

Instead of forming the rib 13 around the entire circumference of the rings 12 I may form it only over the lower semicircumference of said rings, as shown at $13^\times$ in Figs. 4, 5, and 6. In each case there will of course be no groove for its reception in the upper casing-section 1.

While it is preferable to use both the rings 11 and the rings 12, as here illustrated, I may use only the rings 11, in which case the usual solid casing-flanges 9 and 10 will inclose them, or I may use only the rings 12, in which case they will inclose the solid body of the wheel.

I claim—

1. In combination with a single rotary pump-wheel, a casing therefor having openings in its opposite sides, wearing-rings secured in said openings and wearing-rings secured on said wheel periphery and received in said first-named wearing-rings; the bearing-surfaces being parallel to the axis of said wheel.

2. In combination with a single rotary pump-wheel and a casing divided horizontally into an upper and a lower section and having openings receiving said wheel in the opposite sides of said casing said openings being provided with grooves in their walls and wearing-rings received in said openings and provided with ribs constructed to enter said grooves.

In testimony whereof I have signed my name to this specification in the presence of two subscribing witnesses.

ELOF MEDEN.

Witnesses:
GEO. R. REMINGTON,
GEO. D. TALLMAN.